United States Patent [19]

Lemelson

[11] 3,872,462

[45] Mar. 18, 1975

[54] FORM FILLING SYSTEM AND METHOD

[76] Inventor: Jerome H. Lemelson, 85 Rector St., Metuchen, N.J. 08840

[22] Filed: Feb. 16, 1973

[21] Appl. No.: 333,119

Related U.S. Application Data

[63] Continuation-in-part of Ser. No. 225,173, Aug. 27, 1962, and a continuation-in-part of Ser. No. 325,934, Jan. 22, 1972.

[52] U.S. Cl. ......340/324 A, 340/324 AD, 178/7.5 D, 354/76, 360/32

[51] Int. Cl. .......................................... H01j 29/70

[58] Field of Search ............ 315/22, 18; 340/324 A, 340/324 AD; 178/6.7 R, 7.5 D, 7.8, 17 A, 17 C, 7.7

[56] References Cited

UNITED STATES PATENTS

| | | | |
|---|---|---|---|
| 3,165,045 | 1/1965 | Troll | 340/324 AD |
| 3,241,120 | 3/1966 | Amdahl | 340/324 AD |
| 3,346,853 | 10/1967 | Koster et al. | 340/324 A |
| 3,382,487 | 5/1968 | Sharon et al. | 340/324 AD |

*Primary Examiner*—Maynard R. Wilbur
*Assistant Examiner*—J. M. Potenza

[57] ABSTRACT

An apparatus and method are provided for composing and filling out forms with variable data which is selectively entered or printed onto blank spaces of the forms. In one form, the image of a document which is adapted to serve as a record when properly completed with the variable information entered thereon, is generated on the viewing screen of an electronic display such as a cathode ray tube by generating the full-frame video picture signal from a recording thereof which was originally generated by video scanning the original document. Character generating signals representative of the variable information are thereafter generated by selectively depressing keys and operate to generate characters along selected blank spaces of the form image by modulating and deflection controlling the write-beam which is also utilized to generate the image of the form. Digital signals generated by a computer or storage device may also be utilized to create the image of the form on the cathode ray tube and automatically operable means is provided to deflection control the write-beam of the tube to the head of each selected blank space of the image of the form prior to effecting each entry of information thereon.

When the blank spaces defined by the image of the form are completely or suitably filled with information, a camera or other suitable copy making device is operated to provide a print or reproduction of the form.

A full-frame video signal may also be generated by properly operating the read-beam of the tube to scan the image screen thereof after the form has been suitably filled out.

16 Claims, 5 Drawing Figures

FORM FILLING SYSTEM AND METHOD

RELATED APPLICATIONS

This is a continuation-in-part of application Ser. No. 225,173 filed Aug. 27, 1962, for Videotape Recording, having as a parent application Ser. No. 668,348, filed June 27, 1957, now U.S. Pat. 3,051,777. This is also a continuation-in-part of application Ser. No. 325,934 filed Jan. 22, 1972, for Data Generating System.

SUMMARY OF THE INVENTION

This invention relates to an apparatus and method for composing or filling out documents which contain fixed information and one or more blank spaces on which it is desired to enter or print variable information.

Substantially large quantities of documents such as business forms, personal record forms, questionnaires, order blanks, legal forms, way bills, labels, inventory record forms, medical and hospital records, military and government information forms and many other types of pre-printed documents are prepared and filled out annually to gather information and prepare records for various purposes. These forms are generally completed either by type-writing information along the blank spaces thereof or by hand writing same. Both these procedures are relatively time consuming, tedious and costly. If the forms are filled out by hand, it is frequently difficult to interpret the information entered onto the blank spaces of the forms.

Accordingly, it is a primary object of this invention to provide a new and improved apparatus and method for creating documents containing fixed information and variable information.

Another object is to provide an improved system for storing information about a subject which information may be easily created, stored and reproduced with a minimum requirement of human effort.

Another object is to provide a record keeping system for rapidly recording and updating form information.

Another object is to provide a record keeping system employing fixed information and the capability of recording variable information predeterminately with respect to the fixed information and generating displays or hard copies of the total information in the form of filled out business forms and the like.

Another object is to provide a form recording and reproduction system which does not require the pre-printing of forms to be filled out wherein the forms are generated and filled out electronically and copies thereof may be made thereafter.

Another object is to provide a record keeping system for information in the form of fixed data such as data appearing on a form and variable data such as that which is entered on blank spaces of the form wherein entries may be made and changed or corrected electronically prior to the printing of the form.

Another object is to provide a system for electronically generating fixed and variable information such as the information contained on a business form wherein the information may be viewed on a display screen, recorded electronically for future reference and generated as hard copy.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention, as claimed.

The instant invention is concerned with the application of electronic techniques to generate and fill out forms containing fixed information and variable information associated with the fixed information. Forms such as those associated with order placing, inventory, billing and records of all kinds which are kept with respect to information recording generally require typing or hand written operations for the entry of variable data therein. The instant invention employs an electronic system for generating and displaying fixed or form information and variable information on a monitor screen. When the proper information has been generated and displayed to an observer or operator, he may generate hard copy thereof and/or record the information electronically in a form whereby it may be again generated and similarly displayed. The apparatus which will be hereinafter described is subject to certain variations in structure and operation, but in general it may be defined as comprising a means for generating an image of a form on a display screen and a second means for manually or otherwise entering variable information along one or more selected portions of the display screen, preferably along selected blank spaces of the image of the form so that a print may be made of the entire information thereafter or a full-frame video picture signal may be generated and recorded for future playback and regeneration of the form including the information added to the blank spaces thereof or may be transmitted as a facsimile signal to another location or recorder.

An image of the form to be filled out or completed by an operator may thus be generated on a display screen by deflection controlling and intensity modulating a cathode ray tube image writing beam with a full-frame video picture signal of the type defined in my pending application Ser. No. 225,173 by means of an apparatus of the type also disclosed in said application or may be generated by other means such as by selectively reproducing digital character generating signals from a computer or memory and applying same to a character generating, cathode ray storage tube. In a third technique to be described herein, the form images are generated on a display screen by projecting light through a microfilm image of the form which is provided as a slide or as part of an aperture card which is inserted into a projection device located adjacent to a cathode ray tube which is used for generating variable information such as lines of characters and operable to project the form image on the display screen of the tube, from either side thereof, so that the image thereof may be viewed by an observer and may be photographed or otherwise scanned to generate hard copy and, in certain instances, full-frame video picture signals of the information displayed.

Once the form is displayed on the display or monitor screen, the person entering variable data thereon selectively operates keys of a keyboard to properly deflection control the write-beam of an electron gun to first position it at a first location on the image screen which is preferably the start of the first blank space of the form displayed thereon to receive information. Thereafter, the character generating keys are further selectively depressed to generate signals which are operable to properly deflection control the write-beam to cause it to generate a series of characters such as alphabetical words and/or numbers extending as a line or lines along the blank space to be filled out and representing the information to be entered thereon. When a particular blank space has been completely filled out or the desired information entered therein as a visual display on the display screen or face of the cathode ray tube, the operator then depresses a key which results in the generation of further deflection control signals for positioning the write-beam of the tube in alignment with the beginning of the next blank space of the form after which the procedure of selectively operating the character generating keys may be repeated to generate and provide additional character information along the next blank space which process is repeated until the entire form displayed has been filled out or completed as required. The operator may then generate a hard copy print of the form by selectively operating a camera, such as a Polaroid camera or a copying machine such as a Xerographic printer which is operable to receive and be modulated by light from the display screen of the cathode ray tube. The operator may also activate a control switch for causing a read-beam to flood the entire storage print of the tube with a collimated beam of primary electrons causing an output full-frame video picture signal representative of the information displayed, to be generated and transmitted to a local or remote recorder.

The drawings provided herein are in the form of schematic and block diagrams of the components and subsystems defining the instant invention and, as such, do not illustrate certain details for the purpose of simplicity. It is therefore assumed that the correct power supplies are provided on the correct sides of all switches, controls, display and storage tubes, solenoids, motors, transducers, deflection circuits, electrodes and other components.

Figure 1:
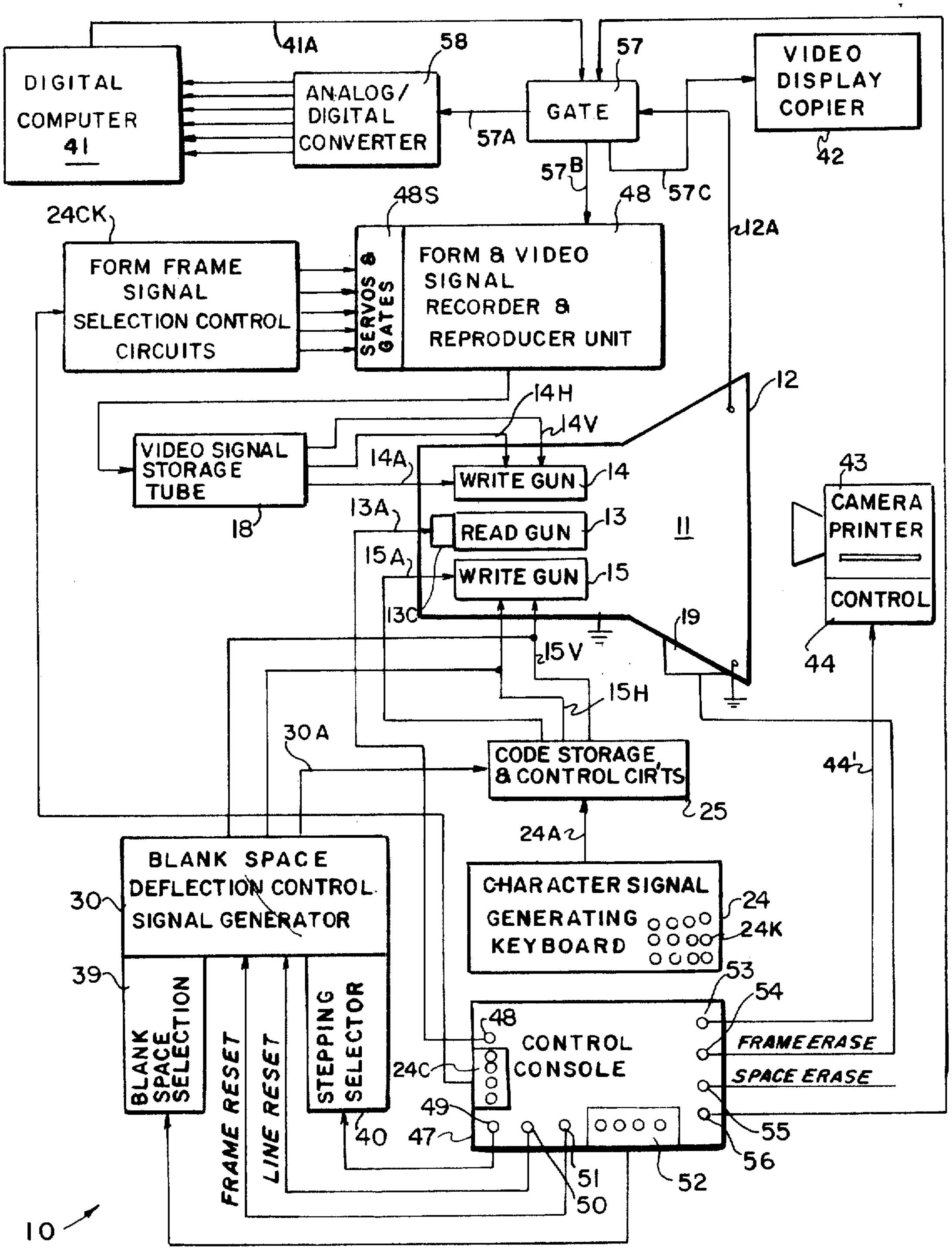
FIG. 1 is a systematic diagram of a system for electronically producing and completing a record form.

Turning now to FIG. 1, there is shown a system 10 for generating fixed information such as the images of business forms and the like to be completed by entering variable information at selected locations thereof. The form image is generated and predeterminately aligned and positioned on the display screen 12 of a cathode ray tube 11 of the write-read type such as defined in the text entitled *Storage Tubes and Their Basic Principles* by Knoll and Kazan, published by John Wiley and Sons, Inc., New York, or modified forms thereof. A variety of cathode ray image storage tubes are also available which may be utilized per se or modified as set forth hereafter to generate both fixed and variable information in response to a signal or signals generated by a form signal reproduction unit 48.

The direct viewing cathode ray tube 11 is shown in FIG. 1 as having three guns including a read-beam generating gun 13 and two writing electron guns 14 and 15. When the input 13A of the read gun 13 is energized by depressing a switch 48 on a control console 47, the control 13C of the gun is activated causing the read-beam to be generated and flood the storage grid of the tube with primary electrons which results in the generation of a video signal on the read-output 12A of the tube which video signal contains all the information recorded on the tube storage element and viewable on the screen 12 thereof.

In operating the apparatus 10 of FIG. 1, the image of a form to be completed is first generated on the viewing storage screen 12 of tube 11 by selectively operating selection switches of a bank 24C of switches on the control console 47 to generate selection signals on the input to a form frame signal selection controller 24CK which operates in response to said signals to selectively control the servos 48S operating the form signal recorder and reproduction unit 48 which may comprise a video tape recording and reproduction apparatus of the type defined in application Ser. No. 225,173. The output of the video signal reproduction unit 48 is a full-frame video picture signal representative of the selected blank space containing form which signal is passed to a video signal storage tube 18 having outputs which extend respectively to the intensity modulation input 14A, the horizontal deflection control signal input 14H and the vertical deflection control signal input 14V of writing electron gun 14 with the result that the image of the selected form is written onto the display and storage screen 12 of the cathode ray tube 11. It may be retained as a form image on screen 11 by conventional retention means which may be inherent in the cathode ray storage tube 11 or may be repeatedly generated on the outputs of video signal storage tube 18 at a frequency sufficient to retain said image without its disappearing to the inherent decay in the light emission from the phosphor of the display screen.

Once the image of the incomplete form is generated on the display screen 12, the operator closes a switch 49 on control console 47 which operates a stepping selector 40 which selectively reproduces a first group of horizontal and deflection control signals from a blank space signal generator 30 on outputs thereof which extend to the horizontal and vertical deflection control inputs 15H and 15V for the second writing electron gun 15 of tube 11. This serves to position the character writing electron beam of gun 15 at the beginning of the first blank space of the form whereafter, by selectively depressing keys of 24K of a character signal generating keyboard 24, chains of character signals are generated on the output 24A thereof and transmitted to a code storage and control unit 25 having outputs which extend to the beam intensity modulating 15A and the horizontal and vertical beam deflection control inputs 15H and 15V of writing electron gun 15. The intensity and deflection control signals generated by properly operating the keys of keyboard 24 may be immediately applied to cause the beam of gun 15 to write selected characters in a line along the blank space to the beginning of which the beam has been selectively deflected by the signals generated by signal generator 30. An output 30A from the blank space control generator 30 is also shown extending to the code signal storage unit 25 and may be optionally employed to prevent the generation of character generating signals on the outputs of unit 25 until the write-beam of gun 15 has been properly located.

Each time a blank space of a form has been suitably or properly filled in with characters, the operator closes switch 49 causing the stepping selector 40 to become activated so that the next group of blank space deflection control signals are generated on the outputs of generator 30 and are applied to the delfection control circuits of character generating write gun 15 to cause the beam thereof to step to the beginning of the next blank space after which it may be selectively controlled to write characters along said next space by selectively depressing the key operated switches of the keyboard 24.

Also shown in FIG. 1 is a switch 50 located on the control console 47 for activating a control 39 for signal generator 30 to generate those signals necessary to reset or reposition the beam of the write gun 15 at the beginning of the blank space to which it is deflected in the event that an error has occurred and it is desired to reinitiate the writing of characters along said blank space. A further control switch 55 is provided which erases any previously recorded characters generated along the same blank space of the form.

When a control switch 51 is manually closed, it operates the blank space signal generator and causes it to generate the first group of deflection control signals which are operable to locate the beam of gun 15 at the beginning of the first blank spaces of the form associated with the signals so generated. A further key operated control 52 composed of a plurality of key switches extends to control 39 which is operable to selectively reproduce any of the signals recorded in the blank space signal generator 30 in the event that the operator desires to enter, reproduce or erase information relative to any blank space on the form even though other spaces thereof have been recorded along.

If it is desired to erase all information recorded on the screen 12 of cathode ray tube 11, a switch 54 is closed which energizes an erasure circuit 19 associated with the tube 11 so as to clear the entire display screen thereof of information.

A further control 53 located on console 47 comprises a switch, which when manually closed, generates a control signal on an input 44' to a control unit 44 associated with a copying device 43 such as a camera, Xerographic printer or suitable unit adapted to receive light from the image recorded on the screen 12 of tube 11 to make a hard copy print of the form displayed and the variable information recorded along one or more blank spaces of said form as described.

In addition to making hard copy of the form and the variable information recorded along the blank spaces thereof, facsimile signals in the form of full-frame video picture signals may be generated on the reading output 12A of tube 11 and recorded on magnetic tape or digitized and transmitted to a computer. A remotely controlled switch 57 is shown in FIG. 1, operatively connected to the output 12A for gating the full-frame video picture signal generated thereon either on an output 57A to an analog to digital converter 58 or an output 57B extending to a recording head which may form part of the signal recorder and reproducer unit 48. The outputs of analog to digital converter 58 extend to a digital computer 41 and may transmit all of the digitized information contained in the full-frame video picture signal of the entire form and the variable information recorded thereon or just the variable information recorded on the blank spaces of the form. Signals generated by computer 41 on an output 41A thereof in response to the first signals received from converter 58 may be utilized to open and close gate 57 so as to pass just those portions of the video picture signal which are generated in scanning a variable information recorded on the display screen 12 of tube 11.

Gate 57 may comprise a single input, multiple output switch such as a rotary stepping switch controlled by push-button or dial means activated by the operator of the console 47, or may comprise a plurality of separately actuated switch contact pairs. Said gate also has an output 57C to a video display copier 42, such as the Electronic HardcopierModel 76 manufactured by Infomax Corporation of Sunnyvale, Calif. which is an electrostatic printed page generator operable in response to received full frame video signals such as generated on output 12A when the reading input of tube 11 is activated as described. The copier 42 may be conditioned to receive the video signal from tube 11 when switch 57 is activated to pass its input to output 57C to generate a different type of copy than that generated by camera 43.

Figure 2:
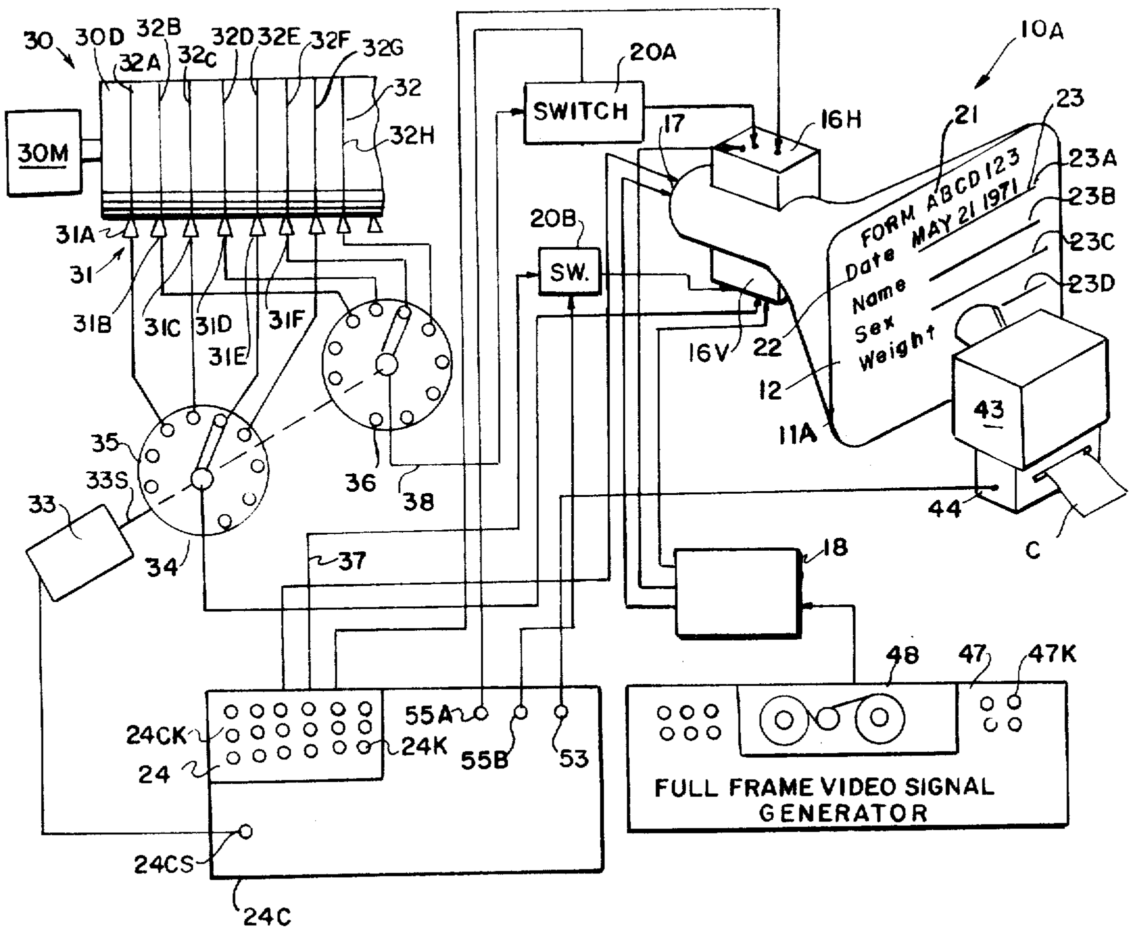
FIG. 2 is a systematic diagram showing further details of a form producing and filling system which is a modified form of the system of FIG. 1.

FIG. 2 illustrates a modified form of the invention and shows further details of the blank space signal generator 30 of FIG. 1. The direct viewing cathode ray tube 11A is shown having its viewing screen 12 containing an image 21 of a form composed of lines 22 of alpha-numeric characters and blank spaces 23, denoted 23A, 23B, 23C, 23D, etc., each of which is predeterminately located with respect to an associated line of form information such as words calling for such variables as date, name, sex, weight, height, etc. The date blank space 23A is shown containing characters representative of a particular date such as the day on which the form is filled out. The direct viewing cathode ray tube 11A of the system 10A of FIG. 2 contains horizontal deflection controls 16H and vertical deflection controls 16V, each of which has input or inputs extending from the described storage tube 18 for form image generating signals, the blank space deflection control signal generator 30 and the outputs of the character generating signal keyboard 24.

Once the image 21 of the selected form has been generated, it may be held by conventional means on the storage screen 12 and viewed by an observer or operator who may thereafter proceed to fill in the blank spaces by selectively operating the character generating keys 24K of keyboard 24 after the write-beam of the tube is selectively located at the head of each blank space, an operation which may be performed by selectively depressing suitable deflection control keys of the keyboard or by means of an automatic deflection control signal generator 30 which, in FIG. 2, comprises a multi-track magnetic drum 30D which is rotated at suitable speed by a constant speed motor 30M and having recorded on the respective tracks 32 thereof pairs of horizontal and vertical deflection control signals, each pair of which is adapted to be simultaneously reproduced by selectively gating the outputs of respective transducers 31 through separate decks of a multi-deck stepping switch 34 to the image writing inputs including beam intensity modulation input 17 and the horizontal and vertical deflection control plates 16H and 16V of the cathode ray tube 11A. Magnetic reproduction heads 31A and 31B, for example, reproduce deflection control signals from respective adjacent tracks 32A and 32B which signals are applied to the vertical and horizontal deflection plates 16v and 16H for the write-beam of the display tube 11 and cause said write-beam to be located at the beginning of a first blank space such as that denoted 23A, while pickup heads 31C and 31D reproduce vertical and horizontal deflection control signals on the outputs 37 and 38 of the multi-deck switch 34 extending to the horizontal and vertical deflection plates of the tube and cause the write-beam to be deflected to the beginning of the next blank space 23B, and so forth.

Thus the deflection control signals are selectively reproduced in sequence and gated to the horizontal and deflection control plates of the beam after each group of characters has been written along a blank space, by selectively rotating the shaft 33S of stepping switch 34, so that the next group of characters may be immediately written along the next blank space by further selective operation of the character generating keys 24K. The stepping switch 34 is shown having its shaft 33S driven by a rotary solenoid 33 which is pulsed each time a manual switch 24CS, located on control console 24C, is depressed so as to gate the outputs of the next pair of transducers [e.g., those operable to reproduce the next pair of horizontal and vertical deflection control signals of the next two tracks of the drum 30D] to the horizontal and deflection control plates for the read-beam of the display tube 11A so that the next blank space of the displayed form may be filled in with characters generated thereafter without the necessity of manually causing the write-beam to be located at the beginning of said next space. In other words, inputs to the deck 35 of switch 34 are from odd pickup heads 32A, 32C, 32E, etc., which produce respective vertical deflection control signals while inputs from the other deck 38 are from the even track heads 32B, 32D, 32F, etc., which reproduce respective horizontal deflection control signals. Thus, for each position of the switch 34, a respective set of vertical and horizontal deflection control signals will be generated on outputs 37 and 38 of switch decks 35 and 36 and will be applied to properly bias the deflection plates and position the write-beam of the tube for initiating the recording of characters along a respective blank space recording as the keys of the keyboard are selectively activated thereafter.

The shaft 33S of the stepping switch 34 may also be manually rotatable and provided with an indicator so that any desired switch position may be selected permitting the operator to deflection control the write-beam to a particular blank space of the displayed form without sequentially stepping the beam from one space to the next by pulsing the rotary solenoid 33. If the rotary solenoid 33 is reversible so that it may be operated in the clockwise or counter-clockwise direction and so drive the shaft 33S of the stepping switch 34, it may also be remotely controlled by means of an add-subtract counter to control the rotary stepping switch to cause its wiper arms to simultaneously selectively move to any switching position. During such selective operation of the rotary stepping switch 34, it will be desirable to prevent the deflection control signals reproduced from drum 30E from being passed to the deflection control circuits 16H and 16V and accordingly, two switches 20A and 20B are provided in the output circuits 37 and 38 which may be remotely controlled to open and close by respective switches 55A and 55B located on the control console 24C.

While separate writing guns as provided in FIG. 1 may be utilized to respectively write the form image and the variable character images along the blank spaces of the form image, a single writing gun may be utilized in an apparatus of the type shown in FIG. 2 if suitable conventional image retention means is provided for retaining the image of both the form and characters on the display screen for a period of time without the need to regenerate the images such as necessitated on a display screen of a cathode ray tube which has a low image persistency. Otherwise, two writing electron guns as provided in FIG. 1 may be utilized, each of which is fed signals at a predetermined reproduction rate from a respective source of the information to be recorded such as respective video storage tubes connected to receive the selected full-frame video picture signal representative of the form image and the character generating signals reproduced by selectively operating the keys of keyboard 24. Storage tube 18 is shown in FIG. 2 although it may be eliminated if a suitable image regenerating circuit is provided associated with the storage screen 12 of tube 11 of FIGS. 1 or 2.

Figure 3:
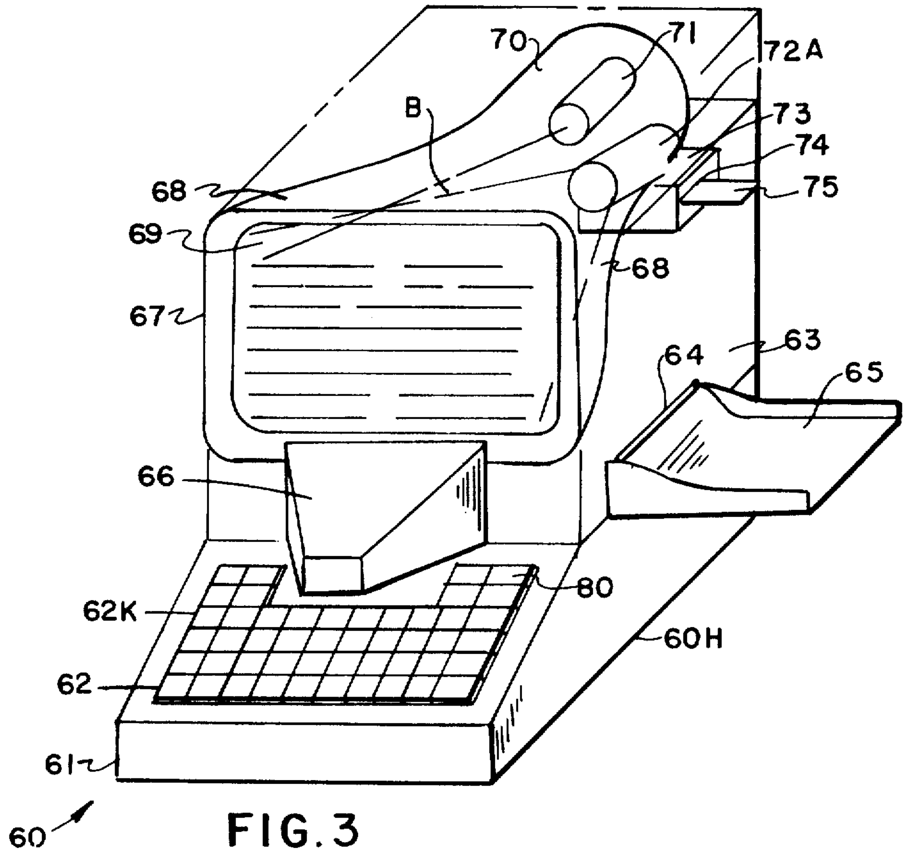
FIG. 3 is an isometric view of a manual input device including a viewing screen for forms, which are adopted to be completed and reproduced as hard copy.
Figures 4, 5:
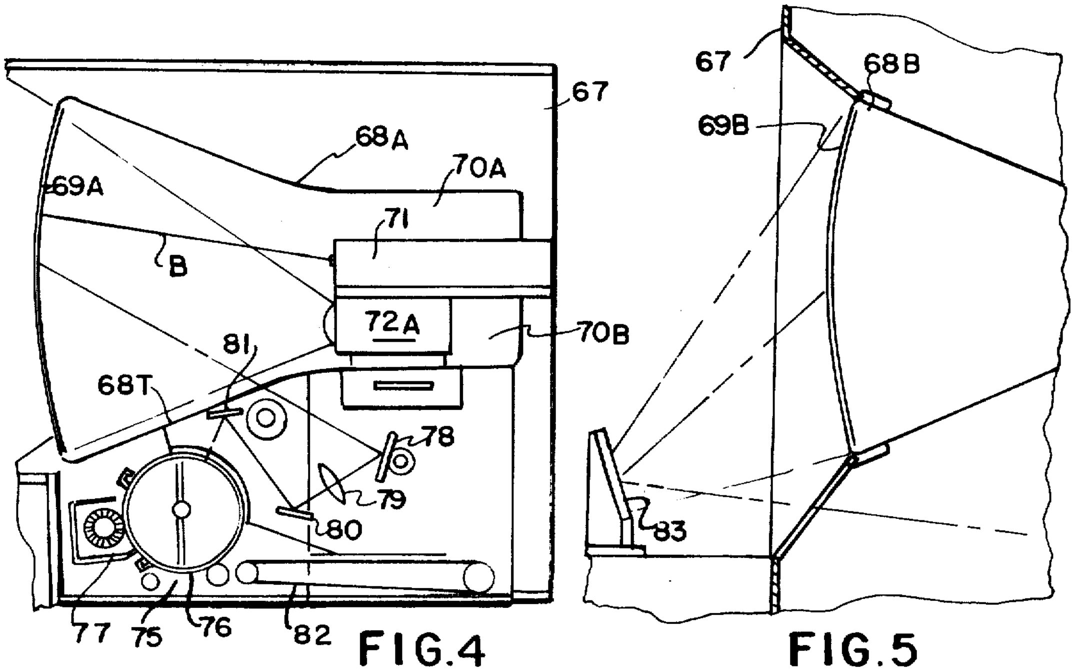
FIG. 4 is a side view of a modified form of the device of FIG. 3 with the side wall removed, showing certain details of the components thereof.
FIG. 5 is a partial side view with parts broken away for clarity of the device of FIG. 3 showing optical producing means for providing an image of the form displayed on the viewing screen of the device.

FIGS. 3 and 4 illustrate variations in a modified form of the invention for producing forms containing fixed and variable information wherein the fixed information is provided by optically projecting an image thereof onto a viewing screen and the variable information is generated by means of writing same with an electron beam either directly on the same screen or onto a separate screen from which the images thereof are projected onto the screen containing the optically projected form image.

In FIG. 3, an apparatus 60 includes a cabinet or housing 60H having a front portion 61 defining a keyboard 62 having a plurality of manually operable character and control keys 62K and containing logic circuitry therein for generating, in addition to control signals, electrical signals which are operable to predeterminately deflection control an electron beam B generated by an electron gun 71 located within the envelope of a cathode ray tube 68 to cause the beam to generate lines of characters on the viewing screen 69 thereof. The cathode ray tube 68 may comprise, as hereinbefore described, a write-read cathode ray tube having the ability to display and store displayed images of lines of characters on its viewing screen 69 in accordance with deflection control and intensity modulation signals generated on inputs 71V, 71H and 71A to the electron gun 71 as generated by the memory or logical circuitry associated with the character generating keys of the keyboard 61, as described.

In FIG. 3, an optical projection system for microfilm slide images is provided within a housing 72 which may be partly or completely located within the envelope defined by the cathode ray tube 68 or may be disposed externally of said envelope and operable to direct its light through a suitable transparent portion of the wall of the tube against the rear wall of the display screen 69 of said tube. The projector housing 72 includes an upper portion 72A and a lower portion 73 containing a slotted opening 74 therein for receiving a microfilm slide or an aperture card 75 containing one or more microfilm images. When the card 75 is completed inserted into the opening 74, light is projected through the microfilm image from the housing 72 against the rear face of transparent or translucent screen 69, thereby generating an image of the form recorded on the microfilm, against the display screen, which image is predeterminately aligned on the display screen when the microfilm frame or card 75 is properly located within the projector housing.

A rear portion 63 of the housing 61 serves to support the cathode ray tube 68, the projector housing 72 and a hard copy printer such as a conventional Xerographic printer, photographic film camera or other suitable device capable of making hard copy of the images appearing on the screen 69. An opening 64 in the side wall 63A of housing rear portion 63 is provided with a tray 65 aligned therewith to receive hard copy prints as they are generated and fed thereto from the copy making machine located within the housing portion 63, an operation which is initiated by closing a push button operated switch 80 on the keyboard 62, preferably after suitable characters have been generated by the controlled operation of electron gun 71 by properly depressing keys of the keyboard. Notation 66 refers to a sub-housing located in front of and below the display screen 69 which is shown recessed within a housing 67 at the front of the tube. The sub-housing preferably contains optics for receiving light from the screen 69 and directing same to the suitable photosensitive element or drum of the printing apparatus located within the rear portion 63 of housing 61.

While the display screen 69 of the apparatus 60 of FIG. 3 has been defined as the viewing screen of the cathode ray tube 68, it may also comprise a separate screen which is operable to receive light reflected from or projected through the viewing screen of the cathode ray tube and also light projected from the optical projector housing 72 to form the composite image. Accordingly, notation 69 may refer to a separate screen located a distance from the viewing screen of cathode ray tube 68 and properly aligned to receive the form image modulated light from the projector 72 and the character image modulated light emitted from the face of the viewing screen of the cathode ray tube 68. The housing 66 may also contain the projector 72 or optical elements for receiving light from said projector and reflecting or otherwise directing said light against the front face of the display screen 69 so that a composite image of the fixed information defined by the form and the variable information defined by the alpha-numeric characters written onto the screen 69 and may be utilized to generate hard copy thereafter as described.

In the embodiment illustrated in FIG. 3, the cathode ray tube 68 may also contain in the rear portion 70 thereof, a reading electron beam generating gun which may be utilized, as hereinbefore described, to cause the generation of a composite full-frame video picture signal representative of the fixed and variable information displayed on the screen, which signal may be recorded and/or digitized as described.

Whereas in FIG. 3 the optical projector 72 is shown as located below the envelope enclosing the elements of the cathode ray tube 68 and is operable to project its light through a flat transparent portion 68T of the lower wall of said tube, in FIG. 4 the projection optics housing 72A of the projector is shown totally enclosed within the rear portion 70A of the cathode ray tube 68A and is operable to receive projection light from a subhousing 73A located beneath and outside of the envelope of the cathode ray tube 68A so that slides or aperture cards of forms may be inserted therein and the images thereof projected against the rear face of the screen of the cathode ray tube.

Accordingly, the lower wall 70B of the rear portion 70A of the envelope defining the cathode ray tube 68A is made of transparent glass which is void of irregularities which would ordinarily distort light passed through the microfilm image of the form from housing 73A to the projection optics located in housing 72A which is disposed within the envelope of the cathode ray tube.

Also illustrated in FIG. 4 is a Xerographic copy making apparatus 75 supported within the lower portion 61A of the housing beneath the cathode ray tube and comprising comventional Xerographic components including a motor rotated drum 76 having a photoconductive layer disposed on its cylindrical surface and adapted to receive light which is modulated in scanning the surface of the display screen 69A of the cathode ray tube 68A. In the apparatus illustrated in FIG. 4, an oscillating mirror 78 is caused to scan the image of a form and characters generated, as described, on the display screen 69A through a flat, undistorted wall portion 68T of the glass envelope defining the wall of the cathode ray tube, from below and to pass the light received thereby through a lens 79, then to a second mirror 80 which reflects said light to a third mirror 81 disposed above the drum 76, thereby providing the composite latent electrostatic image on the drum.

Notation 79 refers to all those conventional components associated with the Xerographic copy making apparatus 75 for applying particles of printing material to the drum and paper fed thereto so as to make a copy of the information recorded on the face 69A of the cathode ray tube. Conventional paper feeding and dispensing means in the form of one or more conveyors 82 are also provided for dispensing the printed sheet of paper or hard copy through an opening in the housing 61 after it has been fully processed.

In another form of the invention shown in FIG. 4, the oscillating mirror 78 may be located to receive light from the front face of the display screen 69 rather than the rear face thereof as shown in FIG. 4. FIG. 5 illustrates a fixed mirror 83 located in front of and just below the display screen of the cathode ray tube 68B and preferably in a housing such as housing 66 of FIG. 3 so as to receive light from said display screen and to reflect said light to the oscillating mirror 78 located in the housing 61 below the cathode ray tube. The oscillating mirror 78 is operable to scan the bright image displayed on the face of the cathode ray tube and to direct said light through a suitable lens and against one or more mirrors which reflect said light against the surface of the Xerographic drum employed to effect hard copy generation by conventional means.

Thus it is seen that the composite image of the form generated on the face of the display screen 69A may be reproduced by directly photographing the display screen from the front or rear thereof, by optically scanning the rear face of the display screen as shown in FIG. 4 or by optically scanning the front face thereof as shown in FIG. 5. The scanning techniques illustrated in FIGS. 4 and 5 to generate hard copy may also be applied for generating copy displayed on the display screens of cathode ray tubes of FIGS. 1 and 2.

Other forms of the invention include the use of projection optics to receive and project images displayed on the display screen of a cathode ray tube and generated by passing projection light through a form image provided in microfilm, in such a manner as to properly combine the two groups of images to provide the one or more lines of variable information or characters at the proper locations of the projected image of the form so that hard copy may be produced thereof by photography, Xerography or other means or so that full-frame video picture signals may be generated thereof and directly recorded for future monitoring or digitized as described.

It is noted that while the memory 30 of FIGS. 1 and 2 which contains recordings of deflection control signals for prepositioning the character generating write-beam of the cathode ray tube at the start of each blank space or line to receive variable information to be generated thereafter by manually or otherwise selectively controlling the write-beam of the tube, is shown as a magnitude drum, it may be provided in other forms such as a disc, tape, or card and selective or sequential reading means for the recording thereof. The drum shown may also contain recording transducing means for the deflection control signals derived from another memory or by manual input means associated with the console so that if the operator desires to work on and produce different forms and to properly fill out same in a rapid manner, he may record or select the proper deflection control signals for the form he selects. Such beam deflection control signals for stepping the beam from one blank space to the next after completing recording of the information along the previous blank space, may also be recorded together with the respective full frame video signals of the forms recorded in the video signal recorder 48 and reproduced therefrom with each selected video signal. Deflection control signals, as described, associated with each video form picture signal, may be reproduced prior to or as the video signal of the selected form is reproduced and recorded on the respective tracks of the drum of FIG. 2 so as to be selectively or sequentially reproducible therefrom as described to position the character write beam of the tube at the starting locations of the blank spaces of the form displayed when the form generating write-beam of the tube is modulated and deflection controlled by the associated full frame video signal.

It is also noted that laser video image generating means may also be employed to generate either or both the images of the forms and character information to be entered thereon and to read the composite images so generated to generate video signals thereof.

I claim:

1. A system for generating forms comprising:

a viewing screen, first means for generating an image on said screen of a form containing fixed information and having locations indicated therein where it is desired to provide variable information, second means for generating images of characters on said screen, third means for electrically controlling said second means to generate selected character images along selected portions of said screen defining said locations of said form where it is desired to provide variable information so as to generate a composite monitorable image on said screen composed of said fixed and variable information, and fourth means for scanning the information defined by said composite image and generating information defining said fixed and variable information in another form.

2. A system in accordance with claim 1 wherein said fourth means comprises means for forming hard copy of said form with the variable information located at predetermined locations on the hard copy of said form.

3. A system in accordance with claim 1 wherein said fourth means comprises means for electrically scanning said information displayed on said viewing screen and generating signals representative of the image displayed thereon, and means for recording at least the variable information displayed on said screen.

4. A system in accordance with claim 3 wherein said fourth means is operable to generate a full-frame video signal of the form and the variable information displayed on said screen, said system further including a magnetic recording means operable to receive said full-frame video signals and record same, and means for generating electrical code signals representative of each full-frame video signal recorded, means for receiving said electrical code signals and recording same adjacent respective full-frame video signals for use in identifying said video signals and reproducible therefrom in effecting the selective reproduction of selected of said full-frame video signals.

5. A system in accordance with claim 3 wherein said fourth means is operable to generate a full-frame video signal of the form, means for receiving and digitizing at least those portions of those video signals comprising said variable information to provide code representations of the variable information and means for recording the digitized signals.

6. A system in accordance with claim 1 wherein said first means comprises an image writing cathode ray tube having a viewing screen and a write-beam generating and deflection control means, and first input means to said beam generating and deflection control means, means for generating a full-frame video picture signal of an incompleted form and applying same to said first input means to intensity modulate and deflection control said write-beam generating and deflection control means so as to cause the write-beam to generate an image of a form on said screen, said second means comprising a keyboard having a plurality of manually actuatable keys and signal generating means associated with the keys of said keyboard for generating character information signals, means for applying said character information signals to said write-beam generating and deflection control means to generate characters on said screen, and selectively operable auxiliary means for predeterminately locating the write-beam of said cathode ray tube at a first location of said screen defining the start of an area along which area variable character information is to be written as characters by said write-beam, said selectively operable auxiliary means being operable after predetermined characters have been selectively written on said screen for predeterminately locating said write-beam at a selected location defining the start of a new area of said screen along which further variable information is to be displayed.

7. A system in accordance with claim 6 wherein said auxiliary means comprises a memory having stored therein deflection control and intensity modulating signals for controlling the beam of said cathode ray tube, means for selectively reproducing different beam generating and deflection control signals from said memory, and means for selectively and sequentially applying said signals reproduced from said memory to locate the write-beam of said cathode ray tube at the start of each area of the screen along which said variable information is to be recorded by the subsequent control of said beam after it has been so predeterminately located.

8. A method for producing and filling out forms comprising:

generating a visually monitorable image of a form having fixed information and spaces defining portions thereof along which spaces is to be recorded variable information, generating variable information and causing said variable information to selectively record lines of characters along said spaces of said image of said form to construct a composite image thereof, and scanning said composite image and generating a recording thereof containing said fixed and said variable information.

9. A method in accordance with claim 8 wherein said screen is capable of forming optical images thereon and said recording is a copy of said form containing said variable information on a sheet of paper.

10. A method in accordance with claim 8 wherein said image of said form is generated by optically projecting said image on a screen.

11. A method in accordance with claim 8 wherein said image of said form is generated by generating full-frame video signals and applying each video signal generated to modulate the write-beam of a direct viewing cathode ray tube and to thereby create a still image of a corresponding form on the viewing screen of said cathode ray tube, and said variable information is generated by deflection controlling a write-beam of said cathode ray tube to form images of selected characters along selected spaces of said screen corresponding to selected blank spaces of the form displayed.

12. A method in accordance with claim 11 wherein said scanning is both optical and electronic and is operable to provide both hard copy of the form and an output electrical signal containing the fixed and variable information, said method further including recording said output electrical signal.

13. A system for generating forms comprising:

a viewing screen, first means for generating an image on said viewing screen of a form containing fixed information and having a plurality of locations indicated thereon where it is desired to provide variable information, second means including a character image writing means and manual input means for controlling said writing means to generate images of characters on said viewing screen, third means for automatically controlling said second means to sequentially step the image writing means thereof to starting positions at each of said plurality of indicated locations so as to automatically position said writing means whereby the manual control of the operation of said writing means thereafter may be automatically effected without further controlling said second means, and fourth means for scanning the composite image generated on said screen by the operation of said first and second means and transducing both said fixed and variable information to another form.

14. A system in accordance with claim 13 wherein said fourth means includes means for forming hard copy containing an image representative of the form generated by said first means and having said variable information predeterminately located at said plurality of indicated locations thereon.

15. A system in accordance with claim 13 wherein said third means includes a memory containing a sequence of separate control signal generating means for generating signals each of which is operable to control said second means to sequentially step the image writing means thereof to said starting positions at each of said plurality of indicated locations and operator controllable means for addressing said memory to generate a different control signal each time said memory is addressed.

16. A system in accordance with claim 15 wherein said second means includes a cathode ray tube having a character writing write-beam, and said memory includes means for generating different control signals for deflecting the write-beam of said cathode ray tube, said memory having an output which is connected to the deflection control circuits of said cathode ray tube whereby when said deflection control signals are sequentially generated from said memory, they will be applied to control the write-beam of said cathode ray tube to respectively position said beam at each of said starting positions for said plurality of indicated locations of the image of the form generated on the viewing screen of the cathode ray tube.

* * * * *